March 21, 1961  J. MARTIN  2,976,033
APPARATUS SERVICING STANDS
Filed July 29, 1958  3 Sheets-Sheet 1

Inventor
JAMES MARTIN
By
Agent

March 21, 1961    J. MARTIN    2,976,033
APPARATUS SERVICING STANDS
Filed July 29, 1958    3 Sheets-Sheet 2

Inventor
JAMES MARTIN
By
Agent

March 21, 1961 J. MARTIN 2,976,033
APPARATUS SERVICING STANDS
Filed July 29, 1958 3 Sheets-Sheet 3
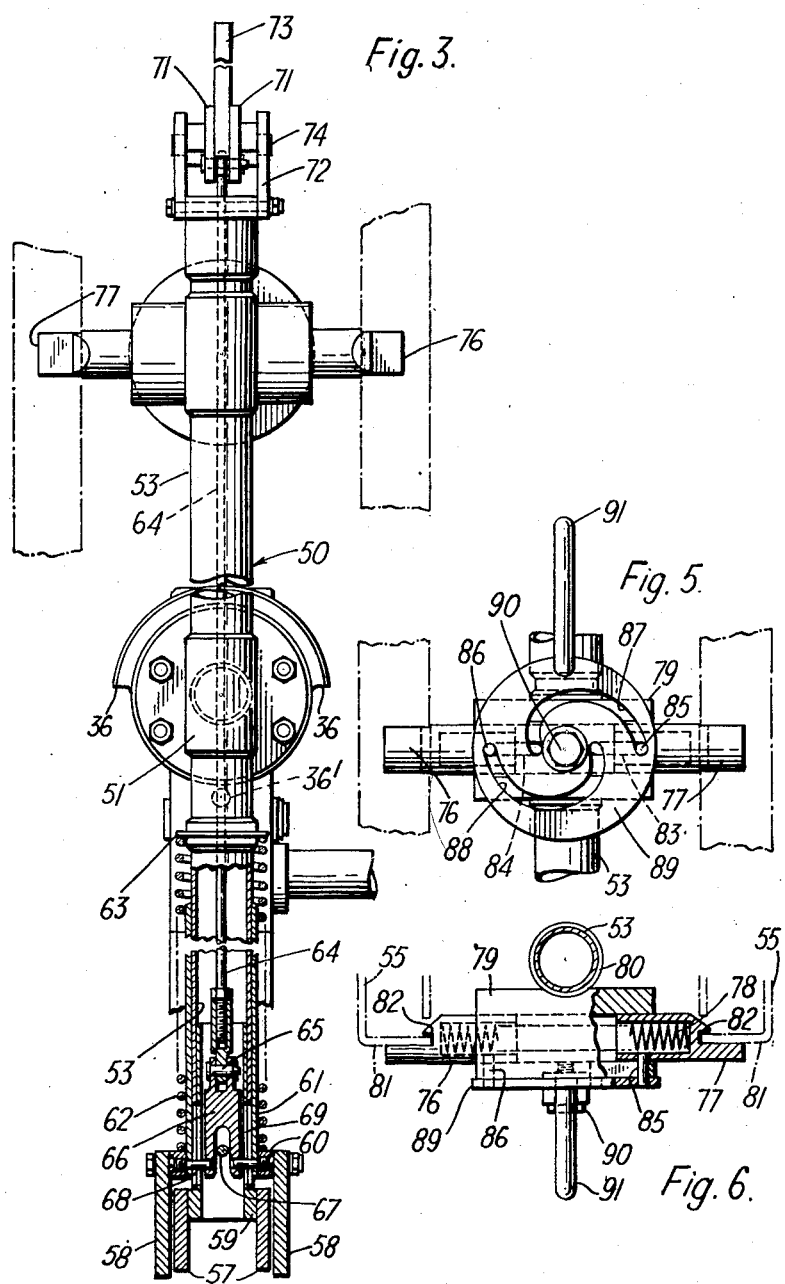
Inventor
JAMES MARTIN
By [signature]
Agent

United States Patent Office 2,976,033
Patented Mar. 21, 1961

2,976,033

APPARATUS SERVICING STANDS

James Martin, Southlands Manor, Southlands Road, Denham, near Uxbridge, England

Filed July 29, 1958, Ser. No. 751,661

Claims priority, application Great Britain Aug. 6, 1957

13 Claims. (Cl. 269—185)

This invention relates to apparatus servicing stands. For convenience in servicing certain forms of apparatus, for example an aircraft ejection seat, it is desirable that the apparatus should be mounted upon a stand where it is supported and held at a convenient level to enable work to be done on it. However, it is also desirable that in the mounted position of an apparatus upon a servicing stand, movement of the apparatus through an appropriate range of positions should be possible to afford ready access to the various parts of the apparatus. For example, in the aircraft industry and those branches of the armed forces employing aircraft fitted with ejection seats, the servicing of aircraft ejection seats is a matter of considerable importance and, since such seats generally have many comparatively delicate mechanisms fixed at various widely distributed locations thereon, it is unwise to service these seats on a bench as movement of the seat on the bench, during servicing, may result in damage to the delicate mechanisms of the seat.

Accordingly, one object of the present invention is to provide a servicing stand upon which an apparatus to be serviced, for example an aircraft ejection seat, can be both secured and, when so secured, moved through a range of positions to afford access to the various parts of the apparatus.

According to one aspect of this invention there is provided an apparatus servicing stand which comprises an upstanding member or pillar (hereinafter called a "pillar") and apparatus supporting means mounted on the said pillar for angular adjustment relatively thereto in two or more intersecting planes, and means for securing said apparatus supporting means in any of a plurality of alternative angularly adjusted positions with respect to the said pillar.

According to another aspect of the invention there is provided an apparatus servicing stand which includes a pillar, apparatus supporting means mounted on an upper part of the said pillar for rotation relatively to the latter through substantial arcs about two different axes disposed transversely of the said pillar and of one another, and means for locking said apparatus supporting means in selected positions after adjustment about each of the said axes.

According to a still further aspect of this invention there is provided an apparatus servicing stand comprising a pillar, an executive member mounted upon the upper part of the said pillar for rotation through a substantial arc about a first axis disposed transversely of the said pillar, locking means for securing the said executive member in any one of a plurality of alternative adjusted positions about said axis, an apparatus supporting member mounted on the said executive member for rotation through a substantial arc about a further axis transverse to, and substantially normal to or substantially parallel with the normal to, the first named axis, and locking means for securing the said apparatus supporting member in any one of a plurality of alternative adjusted positions about the second named axis and relatively to said executive member.

According to a further feature of the invention, the said means for locking the said executive member and said apparatus supporting member respectively in their adjusted positions in relation to said pillar and executive member, comprise in each case a spring biased detent on the one relatively adjustable member of each pair, such detent being adapted to engage in the other member of the pair at any one of a plurality of alternative angularly spaced positions, and manually operable means for withdrawing said detent when required. Preferably the said detent means comprises in each case an axially slidable plunger withdrawable by means of a manually operable hand lever against the action of its biassing spring and adapted at its tip to engage in any one of a plurality of angularly spaced arcuately arranged openings in the member with which the detent is adapted lockingly to engage.

The said apparatus supporting means preferably includes a support arm having, at spaced positions therealong, means for releasably attaching thereto, the apparatus to be serviced. Such attachment means preferably includes hook means to receive a transverse part of said apparatus, and clamping means for retaining said transverse member in said hook means.

Desirably the said support arm is furnished with laterally directed bolts adapted to be engaged with the apparatus to be serviced and means are provided for effecting the engagement and the disengagement of said bolts with and from said apparatus.

Preferably the said pillar is mounted so as to be capable of being turned around and desirably so that it can be moved bodily laterally, e.g. horizontally in any direction, but means are preferably provided whereby, when required, the pillar may be restrained against such movements.

Although it may be of other forms, the said pillar is preferably in the form of a vertically arranged tube carried by a base structure or frame mounted on wheels, at least one of which is a castor wheel, and the said means for restraining the said pillar against lateral movement is conveniently in the form of a brake device acting on said castor wheel both to prevent it rotating and also to restrain it turning about its castoring axis.

Further features of the invention will become apparent from the subsequent detailed description and drawings and the appended claims.

In order that the invention may be more readily understood and carried into practice, one embodiment of the same will now be described by way of example as applied to a stand for use in servicing aircraft ejection seats such as, for example, the Martin-Baker type of aircraft ejection seat of which an early example is shown in Patent No. 2,527,020, this embodiment of the invention being illustrated in the accompanying drawings in which:

Figure 3 is a part sectional front elevation taken on line III—III, Figure 2;

Figure 4 is a fragmentary section elevation taken on a plane at right angles to Figure 2, and showing the method of locking the executive head in adjusted positions on the pillar of the stand;

Figure 5 is a rear elevation of the manually operable control member of the mechanism for securing the upper part of an ejection seat upon the apparatus supporting member of the stand;

Figure 6 is a part sectional plan of the mechanism shown in Figure 5; and

Figure 7 is a part sectional side elevation of the castor wheel mounting of the stand.

Figure 1:
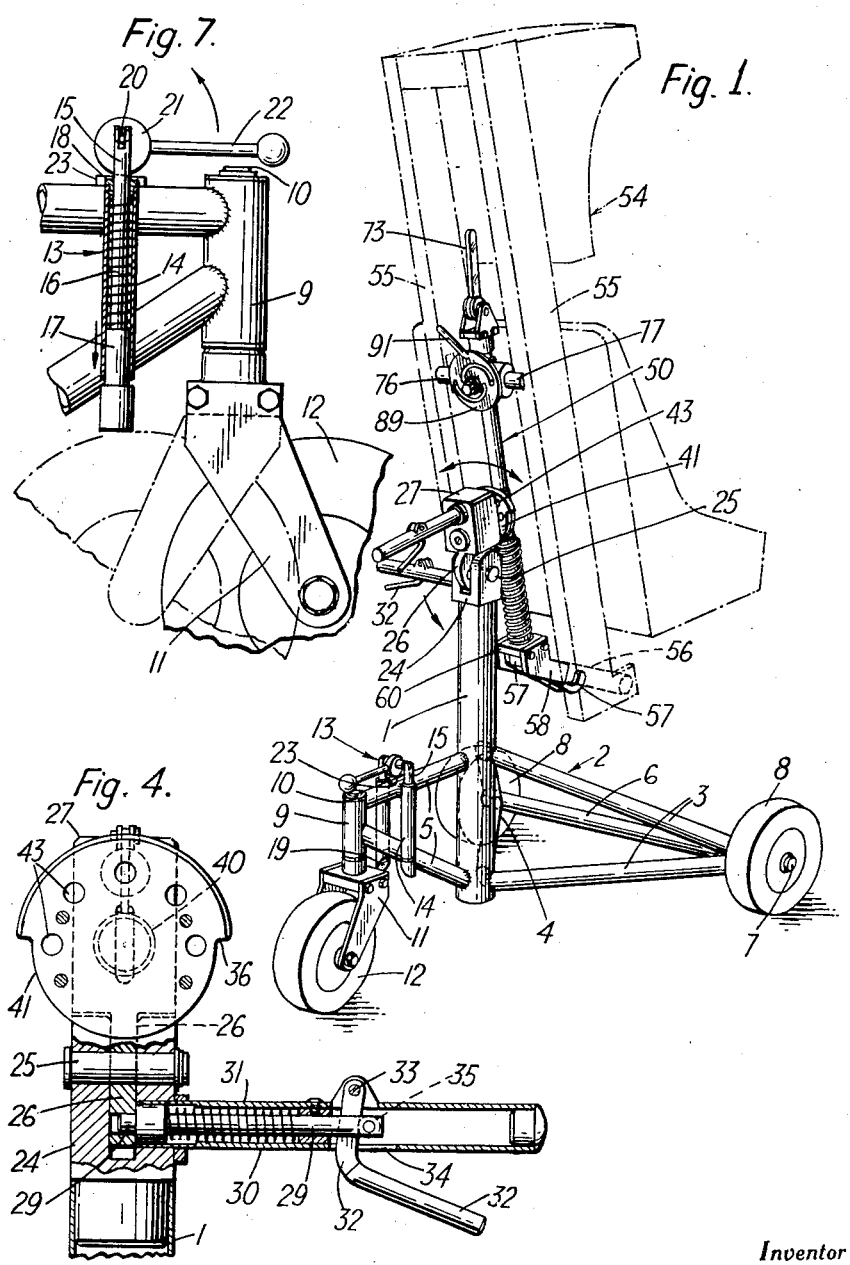
Figure 1 is a perspective view of an aircraft ejection seat servicing stand constructed in accordance with this invention, an aircraft ejection seat being shown (in dotted lines) in position on the stand.

Referring to the drawings it will be seen that the stand there illustrated comprises a tubular pillar 1 at the lower part of which is provided a base-forming spider or framework generally indicated by the reference 2, this framework comprising three arms, 3, 4 and 5 each formed of two lengths of tube arranged in triangular formation and welded to the pillar 1, the arms 3, 4 and 5 radiating from the pillar at angularly spaced locations thereabout. The two arms 3 and 4 are braced together by a cross tube 6 which carries an axle 7 having tired wheels 8 freely mounted on its ends.

The outer end of the arm 5 carries a vertical sleeve 9 (shown enlarged in Figure 7) in which is journalled a spindle 10 of a castor bracket 11 carrying a wheel 12, the bracket being capable of rotation or castoring through 360° about the axis of the spindle 10.

When the castor wheel 12 is in the position shown in Figure 1, the stand is free to be moved about in any horizontal direction and also to be swivelled around the axis of the pillar 1 or an axis parallel to that of the pillar. However, the castor wheel bracket 11 may be swung through 180° from the position shown in Figure 1 into the dotted position shown in Figure 7, where the bracket may be retained and the wheel 12 prevented from rotation by a brake device generally indicated in Figures 1 and 7 by the reference 13.

The said brake device comprises a pair of parallel vertical guide tubes 14 welded to the opposite sides of the arm 5 and each containing a plunger 15 slidable axially in its guide tube 14 and urged downwardly by a compression spring 16 abutting at one end against an enlarged lower head portion 17 of the plunger and at the other end engaging against a plug 18 screwed into the upper end of the guide tube. The lower end of the enlarged head portion 17 of each plunger 15 is chamfered off on its inner side at 19 (see Figure 1) and the arrangement is such that the lower ends of the said plungers are adapted to engage opposite sides of the castor wheel 12 and to secure it in the stowed position shown in Figure 7, and also to act as a brake on the wheel to prevent the latter rotating and thus to retain the stand as a whole substantially stationary.

A spindle 20 is pivotally connected at its ends too, and extends between the upper ends of, the two plungers 15 and on this spindle is rotatably mounted an eccentric or cam 21 furnished with a operating arm 22 by which the eccentric can be rotated about the said spindle. The eccentric is adapted to engage a thrust plate 23 welded to the upper surface of the arm 5 of the stand so that, when the eccentric is moved to the position shown in full lines in Figure 7, the plungers 15 are raised whereas, when the eccentric is rotated from the said position through 180° in the direction of the arrow shown in Figure 7, the plungers 15 are permitted to descend under the action of the springs 16 to grip the wheel 12, assuming the latter has been swung into the dotted position shown in Figure 7.

In the upper end of the pillar 1 is fixed a bifurcated bracket 24 between the arms of which extends a horizontal pivot pin 25 (see Figures 1, 2 and 4) to which is pivoted, at its centre of curvature, a vertically disposed part-circular or sector-like plate 26 depending centrally from the underside of a block 27 of substantially rectangular prism form and constituting the executive member of the stand.

The plate 26 is furnished near its periphery with a plurality of angularly spaced arcuately arranged slightly tapered openings or holes 28 which are adapted selectively to be engaged by the correspondingly slightly tapered end of a retractable spring biassed executive member locking detent or plunger 29 mounted for guided movement in a tubular housing 30 screwed into, and locked in, one side arm of the bifurcated bracket 24, the axis of the housing 30 being at right angles to the axis of the pillar 1 and parallel to the pivot pin 25. A compression spring 31 biases the plunger 29 to its locking position and a manually operable lever 32, pivoted to the housing 30 at 33, passes through diametrical slots 34 in the housing and through a diametrical slot in the outer end of the plunger 29 where the lever engages a roller 35, movement of the lever 32 in an upward direction towards the housing 30 causing the withdrawal of the plunger 29 to free the executive member 27 for adjustment about its pivot pin 25. To operate the lever 32, the housing 30 is encompassed by the hand and the lever 32 is gripped by the fingers and pulled upwardly.

In the executive member 27 is rotatably mounted a cylindrical spigot 40 (see Figure 2) integral with an apparatus supporting member comprising a plate or disc 41, this plate being located against the front surface of the executive member 27 and the spigot 40 being arranged at the centre of curvature of this plate and being retained in the head 27 by a retaining washer 42 secured to the rear end of the spigot.

Figure 2:
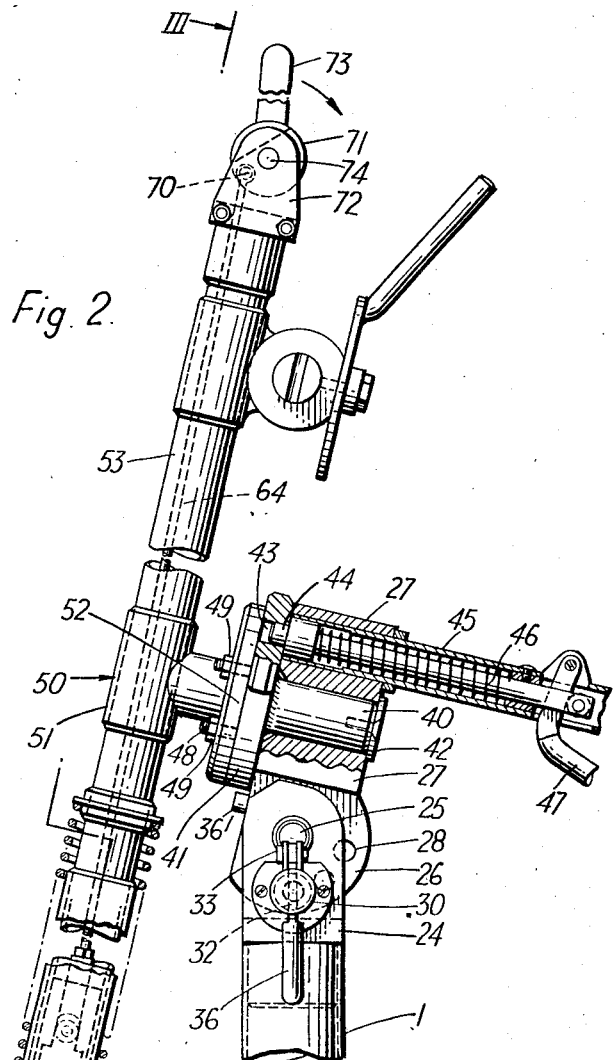
Figure 2 is an enlarged part sectional side elevation of the apparatus supporting member, the executive head on which the said supporting member is mounted, and the upper part of the pillar of the stand.

The axis of the spigot 40 is transverse, and preferably at right angles, to the axis of the pivot pin 25 by which the executive member 27 is pivotally associated with the bifurcated bracket 24, and the extent of rotation of the plate 41 about the axis of the spigot 40 is restricted by radial shoulders 36 on the plate and a co-operating stop pin 36' projecting from the front edge of the plate 26 (see Figures 2 and 3).

The plate 41 is furnished with an arcuate series of angularly spaced openings, e.g., circular slightly tapering holes 43 (see Figures 1, 2 and 4) in which is selectively adapted to engage the slightly tapered tip of an apparatus supporting member locking detent or plunger 44 axially slidable in a housing 45 secured in the upper part of the executive member 27. The plunger 44 and its housing 45 project rearwardly from the executive member 27, being parallel to the spigot 40. The plunger 44 is adapted to be withdrawn by means of a hand lever 47 against the action of a spring 46 in the housing 45 thereby to release the plate 41, the housing 45 and lever 46 being similar in construction to the corresponding parts 30 and 36 associated with the executive member locking plunger 29 already described.

The series of holes 43 in the plate 41 extend around the spigot 40 through approximately 180° and consequently the plate 41 can be adjusted about the axis of this spigot 40 through approximately 180° and can be locked by the plunger 44 in any of its selectable adjustment positions. The extent of adjustment of the apparatus supporting member is limited, as hereinbefore explained, by the radial shoulders 36 and stop pin 36'.

On the plate 41 is detachably secured an assembly generally indicated by the reference 50. This assembly comprises a T-piece 51 the shank of which is furnished with a flange 52 detachably secured by studs 48 and nuts 49 to the front face of the plate 41 coaxially with the spigot 40. In the head of the T-piece 51 (which head is at right angles to spigot 40) is secured a tubular apparatus support member or arm 53 which projects upwardly and downwardly from the T-piece.

The support arm 53 is provided with clamping means for securing thereon an ejection seat, such as that indicated in dotted lines at 54 in Figure 1 and comprising parallel longitudinal flanged side beams 55 having a cross bar 56 extending between the lower parts thereof.

The said clamping means include, as will be more clearly seen from Figures 1, 2 and 3, a pair of laterally spaced parallel hook like elements 57 adapted to engage under the cross bar 56 of the seat 54 and a pair of parallel laterally spaced clamping plates 58 which straddle the mouths of the hooks 57 and are adapted to engage the cross bar 56 on the opposite side thereof to that engaged by the hooks 57.

The hooks 57 are secured at their upper ends to opposite sides of the rectangular lower end of a tubular spigot 59 secured in the lower end portion of the tubular support arm 53, whilst the clamping plates 58 are secured to opposite edges of a rectangular block 60 welded or otherwise suitably secured to the lower end of a sleeve 61 slidable up and down on the lower portion of the arm 53, this sleeve being constantly urged downwardly by a strong compression spring 62 surrounding the sleeve and bearing at its lower end upon the block 60 and at its upper end against a peripherally flanged collar 63 fixed upon the tubular arm 58 at a short distance below the head of the T-piece 51.

It will thus be appreciated that the clamping plates 58 tend always to trap the cross bar 56 in the hooks 57: to release the bar 56 from the hooks it is necessary to withdraw the clamping plates 58 upwardly with respect to the hooks 57. This is achieved by a pull rod 64 arranged coaxially within the tubular support arm 53 and having its lower end pivotally and adjustably connected at 65 to a slider 66 which is forked at its lower end to accommodate a cross pin 67 fixed in the tubular spigot 60 to prevent rotation of the slider 66 within this spigot.

The lower ends of the arms of the bifurcated slider 66 receive inwardly directed radial pins 68 carried by the block 60 at the lower end of the sleeve 61, these pins passing through longitudinal slots 69 passing, at diametrically opposite positions, through the tubular spigot 60 and tubular arm 53. The sleeve 61, with the clamping plates 58, can thus be raised by the pull rod 64 or be permitted to descend under the action of the spring 62 by allowing the pull rod to descend, the sleeve 61 being restrained against rotation relatively to the support arm 53 by the pins 68 passing through the slots 69 and also as a result of the plates 58 embracing the hooks 57.

The upper end of the pull rod 64 is anchored eccentrically at 70 between a pair of discs 71 located between the parallel side arms of a bracket 72 fixed to the top of the tubular arm 53, the discs 71 having a radial operating handle 73 fixed thereto and being carried by a shaft 74 journalled in the said side arms of the bracket 72.

By rotating the handle 73 from the position shown in Figure 2, and in the direction of the arcuate arrow shown in that figure, the clamping plates 58 can be raised with respect to the hooks 57 and, by turning the operating handle 73 into an over-dead centre position, the pull rod 64 and the clamping plates 58 can be locked in fully raised positions. Rotation of the handle 73 in the opposite direction to the arcuate arrow will, of course, release the pull rod and permit the clamping plates 58 to move to their clamping positions.

The lower end edges 75 of the clamping plates 58 are convergently disposed with respect to the end portions of the hooks 57 so as to ensure that the cross bar cannot slip out of the hooks when the plates 58 are in their locking positions. It will be appreciated also that the clamping means illustrated will accommodate transverse members, such as the cross bar 56, of somewhat different diameters.

For securing the ejection seat 54 to the upper part of the tubular support arm 53, the latter is furnished at its upper portion with fastening means which, in the example illustrated, comprise a pair of coaxial retractable latch bolts 76 and 77 (see Figures 1, 2, 3, 5 and 6) biassed by a compression spring 78 in opposite outward directions with respect to a housing 79 in which the said plungers are mounted for axial sliding movement.

The housing 79 is carried by a sleeve 80 secured to the tubular support arm 53 and the outer ends of the bolts 76 and 77 are adapted to engage in holes (not shown) in the inside webs of the side beams 55 of the ejection seat 54 or, as shown in Figures 3, 5 and 6 of the drawings, to engage flanges 81 of the said side beams, the bolts being recessed and slotted longitudinally as shown at 82 and furnished with oblique inset latch faces 82' for this purpose.

The rear wall of the housing 79 is furnished with a pair of colinear slots 83 and 84 (Figures 5 and 6) along which are slidable radial pins 85 and 86 carried respectively by the bolts 76 and 77, the outer ends of these pins being located one in each of a pair of oppositely directed scroll or spiral-like cam slots 87 and 88 of a latch bolt retracting cam disc 89 centrally pivoted on a stud 90 screwed into the housing 79 so that its axis intersects the axes of the latch bolts 76 and 77 and the axis of the tubular support arm 53 at right angles. The cam disc 89 is furnished with a rigid radially extending operating handle 91 whereby the disc may be rotated about the stud 90 to retract the bolts 76 and 77.

It will be appreciated that when an ejection seat is to be mounted upon or removed from a stand constructed as above described, it is desirable to lock the stand against movement on its wheels, this being achieved, after turning the castor wheel 12 into the dotted position shown in Figure 7, by means of the brake plungers 17 as hereinbefore described. In mounting a seat on the stand, the clamping plates 58 are then raised by means of the operating handle 73 and the cross bar 56 of the seat 54 is engaged in the hooks 57, after which the handle 73 is released so that the clamping plates 58 secure the member 56 in the hooks 57. Next the side beams 55 are snapped into engagement with the plungers 76 and 77, it only being necessary at this stage to withdraw the plungers by means of the cam disc 89 if the said side members do not readily pass between the said side beams as they should.

The seat may now be adjusted into any of a plurality of selected positions about the axis of the spigot 40 or alternatively or as well into any one of a plurality of alternative positions about the pivot pin 25, all as previously explained. Thus the seat is adjustable relatively to the pillar 1 in a plurality of intersecting planes and can be secured in any of a selected plurality of alternative adjusted positions with respect to said pillar. In addition, by releasing the castor wheel 12, the whole stand may be moved in any horizontal direction or turned around the vertical axis of the pillar 1 or about an axis parallel to that axis.

If desired the pillar 1 may be composed of two or more parts adjustable relatively in an endwise direction. Thus the pillar may comprise two or more telescopically arranged tubes which are adjustable axially relatively to one another and are securable in their relatively adjusted positions, it thus being possible to adjust the height of the stand.

It will be appreciated that though a seat servicing stand has been described which is suitable for use with an aircraft ejection seat, the scope of the invention includes servicing stands for apparatus other than aircraft ejection seats and if desired the support assembly 50 may be modified to suit the particular apparatus to be carried thereby, and may be replaceable by an appropriate alternative assembly.

I claim:

1. An apparatus servicing stand comprising: a pillar; a vertically bifurcated bracket at the upper end of such pillar; a horizontal pivot pin carried by such bracket; an executive member including a sector-like plate formed near to its periphery with a series of arcuately arranged angularly spaced openings, such plate being mounted in the bifurcation of said bracket for pivoting about said pivot pin, whereby the said executive member is rotatable through a substantial arc about a first axis disposed transversely of the said pillar; a first spring biased plunger carried by said bracket and adapted at its tip to engage in any one of the openings in said sector-like plate so as to secure the said executive member in any one of a plurality of alternative positions about said first axis; an apparatus supporting member mounted on the said executive member for rotation relatively thereto through a substantial arc about a second axis perpendicular to the first named axis; a second spring biassed plunger carried by one of said executive and apparatus supporting members and adapted to engage in the other of such members at any one of a plurality of alternative angularly spaced positions so as to secure the said apparatus supporting member in any one of a plurality of alternative positions about said second axis; and two manually operable hand levers connected one to each of said plungers and operable individually to withdraw the same.

2. An apparatus servicing stand according to claim 1, wherein the said apparatus supporting member comprises a plate rigidly carried by a spigot perpendicular thereto and journalled for rotation in said executive member, said plate being furnished with a series of arcuately arranged angularly spaced openings with which said spring biassed plunger is adapted selectively to be engaged, said plunger being carried by said executive member.

3. An apparatus servicing stand according to claim 2, wherein stop shoulders are provided upon the said plate of the apparatus supporting member for co-operation with an abutment on said executive member to limit the rotation of said plate to less than 360°.

4. An apparatus servicing stand according to claim 3, wherein the said apparatus supporting member also includes an arm rigidly fixed to said plate for rotation with the latter about the axis of said spigot, said arm having, at spaced positions therealong, means for releasably attaching thereto, the apparatus to be serviced.

5. An apparatus servicing stand according to claim 1, wherein the said pillar is mounted so as to be capable of being turned round.

6. An apparatus servicing stand including a wheeled carriage, a pillar on such carriage, and a universal mounting adapted to support said apparatus at the upper end of such pillar, such mounting comprising: an executive block; a first plate mounted on such block and formed with a series of arcuately arranged angularly spaced openings, such plate being pivotally mounted on said pillar, whereby said executive block is rotatable through a substantial arc about a first axis disposed transversely of the said pillar; a first spring biassed plunger carried by said pillar and adapted at its tip to engage in any one of the openings in said first plate so as to secure the said executive block in any one of a plurality of alternative positions about said first axis; a second plate formed with a series of arcuately arranged angularly spaced openings and mounted on the said executive block for rotation relatively thereto through a substantial arc about a second axis perpendicular to the first named axis; a second spring biassed plunger carried by the said executive block and adapted at its tip to engage in any one of the openings in said second plate so as to secure the latter in any one of a plurality of alternative positions about said second axis; manually operable means connected to each of said plungers and operable individually to withdraw the same; and apparatus supporting means carried by said second plate.

7. An apparatus servicing stand according to claim 6, wherein said apparatus supporting means includes a support arm; hook means on said support arm adapted to receive a transverse part of the apparatus to be serviced; and clamping means adapted to retain said transverse part in such hook means.

8. An apparatus servicing stand according to claim 7, wherein said hook means are rigidly attached to said support arm, and further including spring means connected to said clamping means and adapted normally to urge the latter towards said hook means, and handle means connected to said clamping means and operable to draw the latter away from said hook means.

9. An apparatus servicing stand according to claim 8, and further including a sleeve slidable on said support arm and carrying said clamping means, a pull rod connected to said sleeve and operable to withdraw said sleeve along said support arm, such handle means being capable of being locked to retain said clamping means withdrawn with relation to said hook means.

10. An apparatus servicing stand according to claim 9, and further including a housing on said support arm, a pair of laterally directed bolts mounted in said housing, spring biassing means engaging said bolts and adapted to urge the latter into engagement with the apparatus to be serviced, and manually actuable lever means connected to said support arm and operable to draw the said bolts towards one another and out of engagement with said apparatus.

11. An apparatus servicing stand according to claim 10, and including a radial pin on each of said bolts, a rotary disc mounted on said housing and formed with a pair of scroll-like slots in each of which one of said pins is engaged so that rotation of said disc in one direction causes withdrawal of such bolts, and an operating handle on said disc.

12. An apparatus servicing stand according to claim 11, wherein said bolts are formed with latch faces so as automatically to snap into engagement with the apparatus to be serviced.

13. An apparatus servicing stand comprising a pillar; a vertically bifurcated bracket at the upper end of said pillar; a horizontal pivot pin carried by said bracket; an executive member including a sector-like plate having a series of arcuately arranged, angularly spaced detents, the plate being mounted in the bifurcation of said bracket for pivoting about said pivot pin whereby the executive member is rotatable through a substantial arc about a first axis disposed transversely of the pillar; a first locking means adapted to engage any of said detents to secure the executive member in any of a plurality of alternative positions about said first axis; and an apparatus supporting member mounted on the executive member for rotation relatively thereto through a substantial arc about a second axis perpendicular to the first axis; a second locking means carried by one of said executive and apparatus supporting members and adapted to engage the other one of said members at any one of a plurality of alternative angularly spaced positions to secure the apparatus supporting member in any one of a plurality of alternative positions about the second axis, and a manually operable actuating means connected to each of the locking means.

References Cited in the file of this patent

UNITED STATES PATENTS

| | | |
|---|---|---|
| 1,216,552 | Dodge | Feb. 20, 1917 |
| 1,349,633 | Staley | Aug. 17, 1920 |
| 1,515,915 | Valenta | Nov. 18, 1924 |
| 1,550,651 | Charter | Aug. 18, 1925 |
| 2,088,236 | Faber | July 27, 1937 |
| 2,168,772 | Huffman | Aug. 8, 1939 |
| 2,495,438 | Bentley et al. | Jan. 24, 1950 |
| 2,559,028 | Oberwegner | July 3, 1951 |
| 2,602,990 | Ferguson | July 15, 1952 |
| 2,654,147 | Wilson et al. | Oct. 6, 1953 |
| 2,763,053 | Anderson | Sept. 18, 1956 |
| 2,803,872 | Massa | Aug. 27, 1957 |

FOREIGN PATENTS

| | | |
|---|---|---|
| 142,968 | Switzerland | Oct. 31, 1930 |